United States Patent
Kentley-Klay

(10) Patent No.: US 10,000,124 B2
(45) Date of Patent: Jun. 19, 2018

(54) INDEPENDENT STEERING, POWER, TORQUE CONTROL AND TRANSFER IN VEHICLES

(71) Applicant: Zoox, Inc., Menlo Park, CA (US)

(72) Inventor: Timothy David Kentley-Klay, Stanford, CA (US)

(73) Assignee: Zoox, Inc., Menlo Park, CA (US)

( * ) Notice: Subject to any disclaimer, the term of this patent is extended or adjusted under 35 U.S.C. 154(b) by 80 days.

(21) Appl. No.: 14/757,015

(22) Filed: Nov. 5, 2015

(65) Prior Publication Data

US 2017/0120753 A1 May 4, 2017

Related U.S. Application Data

(63) Continuation-in-part of application No. 14/932,958, filed on Nov. 4, 2015, now Pat. No. 9,494,940.

(51) Int. Cl.
*G06F 19/00* (2018.01)
*B60L 3/00* (2006.01)
(Continued)

(52) U.S. Cl.
CPC ............ *B60L 3/0092* (2013.01); *B60L 15/20* (2013.01); *B60N 2/002* (2013.01); *B60W 10/08* (2013.01); *B60W 10/18* (2013.01); *B60W 10/184* (2013.01); *B60W 10/20* (2013.01); *B60W 30/02* (2013.01); *B60W 30/18* (2013.01); *B60W 50/023* (2013.01); *B62D 9/002* (2013.01); *B62D 15/027* (2013.01); *G05D 1/0088* (2013.01);
(Continued)

(58) Field of Classification Search
CPC ..... B60L 3/0092; B60W 10/08; B60W 10/18; B60W 10/20; B60W 30/18; B60W 2510/08; B60W 2710/08; B60W 2710/18; B60W 2710/20; B60W 2900/00; G05D 1/0088
USPC ....................................................... 701/1, 22
See application file for complete search history.

(56) References Cited

U.S. PATENT DOCUMENTS 5,558,370 A 9/1996 Behr
5,959,552 A 9/1999 Cho
(Continued)

FOREIGN PATENT DOCUMENTS

EP 2626760 8/2013
WO WO9307016 4/1993
(Continued)

OTHER PUBLICATIONS

U.S. Appl. No. 14/756,991, filed Nov. 4, 2015, Levinson, et al., "Sensor-based object-detection optimization for autonomous vehicles", (127 pages).
(Continued)

*Primary Examiner* — Ronnie Mancho
(74) *Attorney, Agent, or Firm* — Lee & Hayes, PLLC

(57) ABSTRACT

Systems, apparatus and methods to multiple levels of redundancy in torque steering control and propulsion control of an autonomous vehicle include determining that a powertrain unit of the autonomous vehicle is non-operational and disabling propulsion operation of the non-operational powertrain unit and implementing torque steering operation in another powertrain unit while propelling the autonomous vehicle using other powertrain units that are configured to implement torque steering operation and propulsion operation.

22 Claims, 10 Drawing Sheets

(51) Int. Cl.
*B60W 10/08* (2006.01)
*B60W 10/18* (2012.01)
*B60W 10/20* (2006.01)
*B60W 30/18* (2012.01)
*G05D 1/00* (2006.01)
*B60L 15/20* (2006.01)
*B60N 2/00* (2006.01)
*B60W 50/023* (2012.01)
*B62D 9/00* (2006.01)
*B62D 15/02* (2006.01)
*B60W 10/184* (2012.01)
*B60W 30/02* (2012.01)
*B60R 21/01* (2006.01)
*B60W 50/029* (2012.01)

(52) U.S. Cl.
CPC .......... *B60R 2021/01272* (2013.01); *B60W 2050/0295* (2013.01); *B60W 2510/08* (2013.01); *B60W 2710/08* (2013.01); *B60W 2710/18* (2013.01); *B60W 2710/20* (2013.01); *B60W 2900/00* (2013.01); *B60Y 2200/91* (2013.01); *G05D 2201/0213* (2013.01)

(56) References Cited

U.S. PATENT DOCUMENTS

| | | |
|---|---|---|
| 6,301,542 B1 | 10/2001 | Kirchberger et al. |
| 6,374,168 B1 | 4/2002 | Fujii |
| 6,728,616 B1 | 4/2004 | Tabe |
| 7,426,429 B2 | 9/2008 | Tabe |
| 8,123,642 B2 | 2/2012 | Ishikawa et al. |
| 8,126,642 B2 | 2/2012 | Trepagnier et al. |
| 8,392,064 B2 | 3/2013 | Thrun et al. |
| 8,434,919 B2 | 5/2013 | Schofield |
| 8,550,196 B2* | 10/2013 | Ross ............ B60K 1/02 180/65.285 |
| 8,880,272 B1 | 11/2014 | Ferguson et al. |
| 8,977,007 B1 | 3/2015 | Ferguson et al. |
| D743,978 S | 11/2015 | Amin |
| 9,196,164 B1 | 11/2015 | Urmson et al. |
| 9,213,934 B1* | 12/2015 | Versteeg ............ G06N 3/004 |
| 9,384,443 B2 | 7/2016 | Passot et al. |
| 9,395,727 B1 | 7/2016 | Smith et al. |
| 2002/0143461 A1* | 10/2002 | Burns ............ G05D 1/0297 701/117 |
| 2004/0017073 A1 | 1/2004 | Pavlov et al. |
| 2004/0068354 A1 | 4/2004 | Tabe |
| 2005/0216181 A1 | 9/2005 | Estkowski et al. |
| 2006/0064202 A1 | 3/2006 | Gutmann et al. |
| 2006/0175116 A1 | 8/2006 | Friedman et al. |
| 2006/0207820 A1 | 9/2006 | Joshi et al. |
| 2007/0096447 A1 | 5/2007 | Tabe |
| 2007/0246927 A1 | 10/2007 | Okada |
| 2008/0033645 A1 | 2/2008 | Levinson et al. |
| 2008/0084283 A1 | 4/2008 | Kalik |
| 2008/0097699 A1 | 4/2008 | Ono |
| 2008/0320421 A1 | 12/2008 | Demaris et al. |
| 2009/0029826 A1* | 1/2009 | Eguchi ............ B60T 7/02 477/39 |
| 2009/0240647 A1 | 9/2009 | Green et al. |
| 2009/0276149 A1 | 11/2009 | Kauffman et al. |
| 2010/0045482 A1 | 2/2010 | Strauss |
| 2011/0130111 A1 | 6/2011 | Crandall et al. |
| 2011/0288684 A1 | 11/2011 | Farlow et al. |
| 2012/0083960 A1 | 4/2012 | Zhu et al. |
| 2012/0193153 A1 | 8/2012 | Wellborn et al. |
| 2012/0256448 A1 | 10/2012 | Yasui et al. |
| 2013/0006451 A1 | 1/2013 | Cooper et al. |
| 2013/0054133 A1 | 2/2013 | Lewis et al. |
| 2013/0060412 A1* | 3/2013 | Nakagawara ............ B60L 1/005 701/22 |
| 2013/0144476 A1 | 6/2013 | Pinto et al. |
| 2013/0246301 A1 | 9/2013 | Radhakrishnan et al. |
| 2013/0268138 A1 | 10/2013 | Moughler et al. |
| 2014/0032012 A1 | 1/2014 | Joshi et al. |
| 2014/0032049 A1 | 1/2014 | Moshchuk et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0142830 A1 | 5/2014 | Bernzen et al. |
| 2014/0185880 A1 | 7/2014 | Fairfield et al. |
| 2014/0188343 A1* | 7/2014 | Yoshimura ............ B60K 6/46 701/41 |
| 2014/0188347 A1 | 7/2014 | Tabe |
| 2014/0214255 A1 | 7/2014 | Dolgov et al. |
| 2014/0214260 A1 | 7/2014 | Eckert et al. |
| 2014/0244151 A1 | 8/2014 | Matsubara et al. |
| 2014/0257661 A1 | 9/2014 | Schulman et al. |
| 2014/0303827 A1 | 10/2014 | Dolgov et al. |
| 2014/0309833 A1 | 10/2014 | Ferguson et al. |
| 2014/0333468 A1 | 11/2014 | Zhu et al. |
| 2014/0336935 A1 | 11/2014 | Zhu et al. |
| 2014/0358427 A1 | 12/2014 | Fuhrman |
| 2015/0025708 A1 | 1/2015 | Anderson |
| 2015/0039157 A1 | 2/2015 | Wolfe et al. |
| 2015/0039167 A1* | 2/2015 | Ideshio ............ B60W 20/14 701/22 |
| 2015/0039391 A1 | 2/2015 | Hershkovitz et al. |
| 2015/0057871 A1 | 2/2015 | Ono et al. |
| 2015/0091374 A1 | 4/2015 | Lenius et al. |
| 2015/0094850 A1 | 4/2015 | Passot et al. |
| 2015/0127224 A1 | 5/2015 | Tabe |
| 2015/0127239 A1 | 5/2015 | Breed et al. |
| 2015/0149088 A1 | 5/2015 | Attard et al. |
| 2015/0248131 A1 | 9/2015 | Fairfield et al. |
| 2015/0254986 A1 | 9/2015 | Fairfield et al. |
| 2015/0258928 A1 | 9/2015 | Goto et al. |
| 2015/0268665 A1 | 9/2015 | Ludwick et al. |
| 2015/0271290 A1 | 9/2015 | Tao et al. |
| 2015/0292894 A1 | 10/2015 | Goddard et al. |
| 2015/0298636 A1 | 10/2015 | Furst |
| 2015/0336502 A1 | 11/2015 | Hillis et al. |
| 2015/0336524 A1 | 11/2015 | Larner et al. |
| 2015/0338852 A1 | 11/2015 | Ramanujam |
| 2015/0346727 A1 | 12/2015 | Ramanujam |
| 2015/0348221 A1 | 12/2015 | Pedersen et al. |
| 2015/0356368 A1 | 12/2015 | Liu et al. |
| 2015/0359032 A1 | 12/2015 | Menard et al. |
| 2015/0375764 A1 | 12/2015 | Rajendran et al. |
| 2016/0016315 A1 | 1/2016 | Kuffner, Jr. et al. |
| 2016/0071278 A1 | 3/2016 | Leonard et al. |
| 2016/0107703 A1 | 4/2016 | Briceno et al. |
| 2016/0159402 A1 | 6/2016 | Nakaya et al. |
| 2016/0159407 A1 | 6/2016 | Holmstrom et al. |
| 2016/0165775 P1 | 6/2016 | Maillard et al. |
| 2016/0165786 P1 | 6/2016 | Giesen |
| 2016/0189544 A1 | 6/2016 | Ricci |
| 2016/0209220 A1 | 7/2016 | Laetz |
| 2016/0247106 A1 | 8/2016 | Dalloro et al. |
| 2016/0247109 A1 | 8/2016 | Scicluna et al. |

FOREIGN PATENT DOCUMENTS

| | | |
|---|---|---|
| WO | WO2009151781 A1 | 12/2009 |
| WO | 2011154681 A1 | 12/2011 |
| WO | WO2013087527 | 6/2013 |
| WO | WO2014129944 | 8/2014 |

OTHER PUBLICATIONS

U.S. Appl. No. 14/756,992, filed Nov. 4, 2015, Levinson, et al., "Adaptive autonomous vehicle planner logic", (117 pages).
U.S. Appl. No. 14/756,993, filed Nov. 4, 2015, Kentley, et al., "Method for robotic vehicle communication with an external environment via acoustic beam forming", (77 pages).
U.S. Appl. No. 14/756,994, filed Nov. 4, 2015, Kentley, et al., "System of configuring active lighting to indicate directionality of an autonomous vehicle", (141 pages).
U.S. Appl. No. 14/756,995, filed Nov. 4, 2015, Kentley, et al., "Coordination of dispatching and maintaining fleet of autonomous vehicles", (131 pages).

(56) References Cited

OTHER PUBLICATIONS

U.S. Appl. No. 14/756,996, filed Nov. 4, 2015, Douillard, et al., "Calibration for Autonomous Vehicle Operation", (133 pages).
U.S. Appl. No. 14/757,016, filed Nov. 5, 2015, Levinson, et al., "Simulation system and methods for autonomous vehicles" (131 pages).
U.S. Appl. No. 14/932,940, filed Nov. 4, 2015, Levinson, et al., "Automated Extraction of Semantic Information to Enhance Incremental Mapping Modifications for Robotic Vehicles", (130 pages).
U.S. Appl. No. 14/932,948, filed Nov. 4, 2015, Kentley, et al., "Active Lighting Control for Communicating a State of an Autonomous Vehicle to Entities in a Surrounding Environment", (123 pages).
U.S. Appl. No. 14/932,952, filed Nov. 4, 2015, Kentley, et al., "Resilient Safety System for a Robotic Vehicle", (125 pages).
U.S. Appl. No. 14/932,954, filed Nov. 4, 2015, Kentley, et al., "Internal Safety Systems for Robotic Vehicles", (127 pages).
U.S. Appl. No. 14/932,958, filed Nov. 4, 2015, Kentley, "Quadrant Configuration of Robotic Vehicles", (57 pages).
U.S. Appl. No. 14/932,959, filed Nov. 4, 2015, Kentley, et al., Titled "Autonomous Vehicle Fleet Service and System", (103 pages).
U.S. Appl. No. 14/932,962, filed Nov. 4, 2015, Kentley, et al., "Robotic Vehicle Active Safety Systems and Methods", (109 pages).
U.S. Appl. No. 14/932,966, filed Nov. 4, 2015, Levinson, et al., "Teleoperation System and Method for Trajectory Modification of Autonomous Vehicles", (131 pages).
U.S. Appl. No. 14/933,469, filed Nov. 5, 2015, Kentley, et al., "Software Application to Request and Control an Autonomous Vehicle Service", (146 pages).
U.S. Appl. No. 14/933,602, filed Nov. 5, 2015, Levinson, et al., "Machine-Learning Systems and Techniques to Optimize Teleoperation and/or Planner Decisions", (123 pages).
U.S. Appl. No. 14/933,665, filed Nov. 5, 2015, Kentley, et al., "Software Application and Logic to Modify Configuration of an Autonomous Vehicle", (144 pages).
U.S. Appl. No. 14/933,706, filed Nov. 5, 2015, Kentley, et al., "Interactive Autonomous Vehicle Command Controller", (145 pages).
Office action for U.S. Appl. No. 14/932,948, dated Oct. 14, 2016, Kentley et al., "Active Lighting Control for Communicating a State of an Autonomous Vehicle to Entities in a Surrounding Environment", (15 pages).
Office action for U.S. Appl. No. 14/756,995, dated Oct. 31, 2016, Kentley et al., "Coordination of dispatching and maintaining fleet of autonomous vehicles", (35 pages).
Office action for U.S. Appl. No. 14/932,954, dated Mar. 29, 2016, Kentley et al., "Internal Safety Systems for Robotic Vehicles", (17 pages).
Office Action for U.S. Appl. No. 14/933,602, dated Nov. 5, 2015, Levinson et al., "Machine-Learning Systems and Techniques to Optimize Teleoperation and/or Planner Decisions", (11 pages).
Office Action for U.S. Appl. No. 14/932,952, dated Jun. 24, 2016, Kentley et al., "Resilient Safety System for a Robotic Vehicle", 11 pages.
Bayazit et al., "Swarming Behavior Using Probabilistic Roadmap Techniques", Swarm Robotics WS 2004, LNCS, Springer-Verlag Berlin Heidelberg 2005, pp. 112-pp. 125.
Easymile (website), Retrieved from «https://web.archive.org/web/20150723060050/http://easymile.com» Jul. 2015, «https://web.archive.org/web/20150801205410 7/http://easymile.com/mobility-soulition/», Aug. 2015, and «http:www.youtube.com/watch?v=fijDBL76yDY», Feb. 2015, 13 pages.
Office action for U.S. Appl. No. 14/932,963, dated Aug. 15, 2016, Levinson et al., "Adaptive Mapping to Navigate Autonomous Vehicles Responsive to Physical Environment Changes", 15 pages.
Office action for U.S. Appl. No. 14/932,959, dated Aug. 5, 2016, Kentley et al., "Autonomous Vehicle Fleet Service and System", 16 pages.

Office action for U.S. Appl. No. 14/756,992, dated Aug. 25, 2016, Levinson et al., "Adaptive autonomous vehicle planner logic", 9 pages.
Office action for U.S. Appl. No. 14/933,469, dated Aug. 30, 2016, Kentley et al., "Software Application To Request and Control an Autonomous Vehicle Service", 11 pages.
Final Office action for U.S. Appl. No. 14/932,940, dated Nov. 22, 2016, Levinson et al., "Automated Extraction of Semantic Information to Enhance Incremental Mapping Modifications for Robotic Vehicles", 29 pages.
Office action for U.S. Appl. No. 14/932,959, dated Dec. 2, 2016, Kentley et al., "Autonomous Vehicle Fleet Service and System", 21 pages.
Stanford Autonomous Driving Team website <http://driving.stanford.edu/papers.html>; Various; Stanford University 2014. (1 page).
Bodensteiner et al., "Monocular Camera Trajectory Optimization using LiDAR Data", IEEE International Conference on Computer Vision Workshops, 2011, 8 pages.
Office action for U.S. Appl. No. 14/932,962, dated Mar. 21, 2016, Kentley et al., "Robotic Vehicle Active Safety Systems and Methods", 18 pages.
Office action for U.S. Appl. No. 14/932,963, dated Mar. 17, 2016, Levinson et al., "Adaptive Mapping to Navigate Autonomous Vehicles Responsive to Physical Environment Changes", 26 pages.
Office action for U.S. Appl. No. 14/932,940, dated May 4, 2016, Levinson et al., "Automated Extraction of Semantic Information to Enhance Incremental Mapping Modifications for Robotic Vehicles", 22 pages.
PCT Search Report and Written Opinion dated Feb. 2, 2017 for PCT Application No. PCT/US16/60104, 11 pages.
PCT Search Report and Written Opinion dated Mar. 30, 2017 for PCT Application No. PCT/US16/60121, 9 pages.
Office action for U.S. Appl. No. 15/338,002, dated Sep. 14, 2017, Kentley., "Quadrant Configuration of Robotic Vehicles", 9 pages.
Combining 3D Shape, Color, and Motion for Robust Antime Tracking; Held, David, Levinson, Jesse, Thrun, Sebastian, Savarese, Silvio, Robotics: Science and Systems (RSS), Berkeley, California, USA (2014).
Group Induction; Teichman, Alex, Thrun, Sebastian, Proc. of the IEEE/RSJ Intl Conf on Intelligent Robotics and Systems (IROS) (2013).
Automatic Online Calibration of Cameras and Lasers; Levinson, Jesse, Thrun, Sebastian; Robotics: Science and Systems (RSS) (2013).
Precision Tracking With Sparse 3D and Dense Color 2D Data; Held, David, Levinson, Jesse, Thrun, Sebastian; International Conference on Robotics and Automation (ICRA) (2013).
Automatic Calibration of Cameras and Lasers in Arbitrary Scenes; Levinson, Jesse, Thrun, Sebastian; International Symposium on Experimental Robotics (ISER) (2012).
Online, Semi-Supervised Learning for Long-Term Interaction With Object Recognition Systems; Teichman, Alex, Thrun, Sebastian, RSS Workshop on Long-Term Operation of Autonomous Robotic Systems in Changing Environments (2012).
Tracking-Based Semi-Supervised Learning; Teichman, Alex, Thrun, Sebastian; International Journal of Robotics Research (IJRR); http://ijr.sagepub.com/content/31/7/804; (2012).
A Probabilistic Framework for Object Detection in Images Using Context and Scale; Held, David, Levinson, Jesse, Thrun, Sebastian; International Conference on Robotics and Automation (ICRA) (2012).
Practical Object Recognition in Autonomous Driving and Beyond; Teichman, Alex, Thrun, Sebastian; IEEE Workshop on Advanced Robotics and its Social Impacts (ARSO) (2011).
Tracking-Based Semi-Supervised Learning; Teichman, Alex, Thrun, Sebastian; Robotics: Science and Systems (RSS) (2011).
Towards 3D Object Recognition via Classification of Arbitrary Object Tracks; Teichman, Alex, Levinson, Jesse, Thrun, Sebastian; International Conference on Robotics and Automation (ICRA) (2011).
Towards Fully Autonomous Driving: Systems and Algorithms; Levinson, Jesse et al.; Intelligent Vehicles Symposium (2011).

(56) References Cited

OTHER PUBLICATIONS

Traffic Light Mapping, Localization, and State Detection for Autonomous Vehicles; Levison, Jesse, Askeland, Jake, Dolson, Jennifer, Thrun, Sebastian; International Conference on Robotics and Automation (ICRA) (2011).
Automatic Laser Calibration, Mapping, and Localization for Autonomous Vehicles, Levison, Jesse; Thesis (Ph D); Stanford University (2011).
Unsupervised Calibration for Multi-Beam Lasers; Levison, Jesse, Thrun, Sebastian, International Symposium on Experimental Robotics (ISER) (2010).
Robust Vehicle Localization in Urban Environments Using Probabilistic Maps; Levison, Jesse, Thrun, Sebastian; International Conference on Robotics and Automation (ICRA) (2010).
Exponential Family Sparse Coding With Application to Self-Taught Learning; Honglak, Lee, Raina, Rajat, Teichman, Alex, Ng, Andrew Y.; International Joint Conference on Artificial Intelligence (IJCAI) (2009).
Map-Based Precision Vehicle Localization in Urban Environments; Levinson, Jesse, Thrun, Sebastian; Robotics: Science and Systems (RSS) (2007).
Stanford Autonomous Driving Team website <http://driving.stanford.edu/papers.html>; Various; Stanford University 2014.
Combining Data-Driven and Model-Based Cues for Segmentation of Video Sequences; Eckes, Christian, Vorbruggen, Jan C.; Proceedings WCNN '96, San Diego, USA (1996).
A Real-Time Motion Planner With Trajectory Optimization for Autonomous Vehicles; Xu, Wenda et al.; Robotics and Automation (ICRA); Saint Paul, MN, USA (2012).
Dynamic Real-Time Replanning in Belief Space: An Experimental Study on Physical Mobile Robots; Agha-mohammadi, Ali-Akbar et al.; Technical Report TR 13-007; Texas A&M University, USA (2013).
An Evaluation of Dynamic Object Tracking With 3D Lidar; Morton, P., Douillard, B., Underwood, J.; Proceedings of Australasian Conference on Robotics and Automation; Dec. 7-9, 2011; Melbourne, Australia (2011).
Control of Robotic Mobility—On Demand Systems: A Queueing-Theoretical Perspective; Zhang, Rick, Pavone, Marco; Intl Journal of Robotics Research, pp. 1-18, Stanford, USA (2015).
Evaluation of Urban Vehicle Routing Algorithms; Kong, Linghe et al.; Intl Journal of Digital Content Technology and its Applications (JDCTA); vol. 6, No. 23, University of New Mexico, USA (2012).
Real-Time High Resolution Fusion of Depth Maps on GPU; Trifonov, Dmitry; Intl Conference on Computer-Aided Design and Computer Graphics (CAD/Graphics); Guangzhou, China (2013).
Real-Time Image Segmentation on a GPU; Abramov, Alexey et al.; Facing the Multi-Core Challenge, pp. 131-142. Berlin, German (2010).
A Tutorial on Graph-Based Slam; Grisetti, Giorgio et al.; Intelligent Transportation Systems Magazine, IEEE; pp. 31-43 (2010).
Sensor Fusion and Calibration of Inertial Sensors, Vision, Ultra-Wideband and GPS; Hol, Jeroen; Linkoping Studies in Science and Technology, Dissertations No. 1368; Department of Electrical Engineering; Linkoping University, SE-581 83 Linkoping, Sweden; (2011).
Large Scale Dense Visual Inertial Slam; Ma, Lu et al.; FIELD and Service Robotics (FSR); (2015).
Simultaneous Localization, Mapping, and Manipulation for Unsupervised Object Discovery; Ma, Lu et al.; IEEE International Conference on Robotics and Automation (ICRA); (2014).
Online Slam With Any-Time Self-Calibration and Automatic Change Detection; Nima Keivan and Gabe Sibley; IEEE International Conference on Robotics and Automation (ICRA); (2014).

* cited by examiner

INDEPENDENT STEERING, POWER, TORQUE CONTROL AND TRANSFER IN VEHICLES

CROSS-REFERENCE TO RELATED APPLICATIONS

This application is a continuation-in-part of U.S. patent application Ser. No. 14/932,958 filed Nov. 4, 2015, entitled "Quadrant Configuration Of Robotic Vehicles," which is hereby incorporated by reference in its entirety for all purposes.

FIELD

Embodiments of the present application relate generally to methods, systems and apparatus associated with drive operations of robotic vehicles.

BACKGROUND

Autonomous vehicles that lack adequate redundancy in drive systems of the vehicle may not be able to continue drive operations when one or more components of the drive system fail or are otherwise inoperative. In some examples, drive operations must be terminated, potentially stranding passengers being transported by the vehicle. Ideally, an autonomous vehicle ought to incorporate redundancy in drive systems that will allow the vehicle to continue drive operations, or at a minimum continue drive operations for a limited amount of time until the vehicle may be safely taken out of operation.

Accordingly, there is a need for redundancy in systems, apparatus and methods for implementing driverless robotic vehicles.

BRIEF DESCRIPTION OF THE DRAWINGS

Various embodiments or examples ("examples") are disclosed in the following detailed description and the accompanying drawings.

Figure 1:
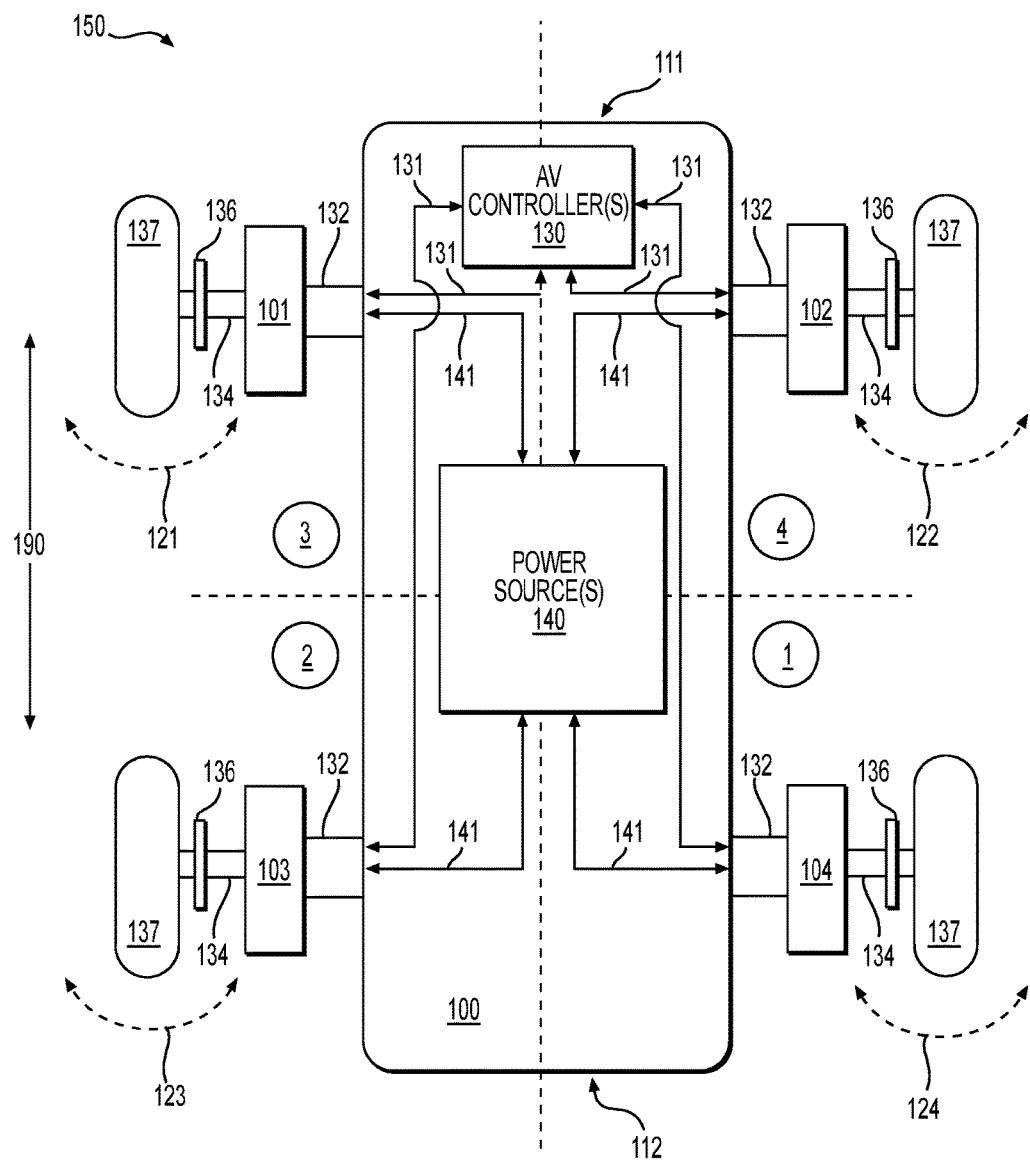
FIG. 1 depicts a diagram of one example of implementation of torque steering in an autonomous vehicle, according to some examples.

Although the above-described drawings depict various examples of the invention, the invention is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, a method, an apparatus, a user interface, software, firmware, logic, circuity, or a series of executable program instructions embodied in a non-transitory computer readable medium. Such as a non-transitory computer readable medium or a computer network where the program instructions are sent over optical, electronic, or wireless communication links and stored or otherwise fixed in a non-transitory computer readable medium. Examples of a non-transitory computer readable medium includes but is not limited to electronic memory, RAM, DRAM, SRAM, ROM, EEPROM, Flash memory, solid-state memory, hard disk drive, and non-volatile memory, for example. One or more non-transitory computer readable mediums may be distributed over a number of devices. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

FIG. 1 depicts a diagram 150 of one example of implementation of torque steering in an autonomous vehicle, according to some examples. In diagram 150, autonomous vehicle 100 may include one or more autonomous vehicle controllers 130 in communication 131 with powertrain units 101-104 being configured to implement torque steering and/or propulsion for autonomous vehicle 100, one or more power sources 140 (e.g., one or more batteries) electrically coupled 141 with powertrain units 101-104. Each powertrain unit may include a connector 132 being configured to electrically couple signals and/or data with power source 140 (e.g., a high voltage connection to a battery) and with vehicle controller 130, an electric motor (not shown), an axle 134 (e.g., a half-shaft including CV joints), a brake 136 (e.g., a disc or drum brake) coupled with the axle 134 and a wheel 137 coupled with the axle 134. Each powertrain unit (e.g., 101-104) may be configured to implement torque steering of its respective wheel 137 by a yaw moment created by changing a rotational speed of the wheel 137. For example, the rotational speed may be changed by changing a speed of an electric motor coupled with the axle 134, by applying the brake 136, or by regenerative braking applied by the electric motor. A change in the steering vector 121-124 of each wheel 137 while torque steering is being implemented need not be the same for each wheel 137 and the steering vectors 121-124 may vary or may be the same, for example.

A failure in one or more of the components or other related systems, hardware, software, etc. associated with one or more of the powertrain units 101-104 may be detected or otherwise determined by AV controller 130 and AV controller 130 may cause one or more of the powertrain units 101-104 to be disabled for propulsion (e.g., disconnect power to its electric motor), for torque steering or both, for example.

Autonomous vehicle 100 may be configured in one or more sections (e.g., quad-sections or half-sections) as denoted by sections 1-4. The sections that constitute the autonomous vehicle 100 may be connected to one another to form the autonomous vehicle 100, as described in U.S. patent application Ser. No. 14/932,958 filed Nov. 4, 2015 entitled "Quadrant Configuration Of Robotic Vehicles," which is hereby incorporated by reference in its entirety for all purposes. Autonomous vehicle 100 may be configured for bi-directional travel as denoted by arrow 190. Autonomous vehicle 100 may not have a front or a rear, and may instead have a first end 111 and a second end 112 that is opposite the first end 111.

Figure 2A:
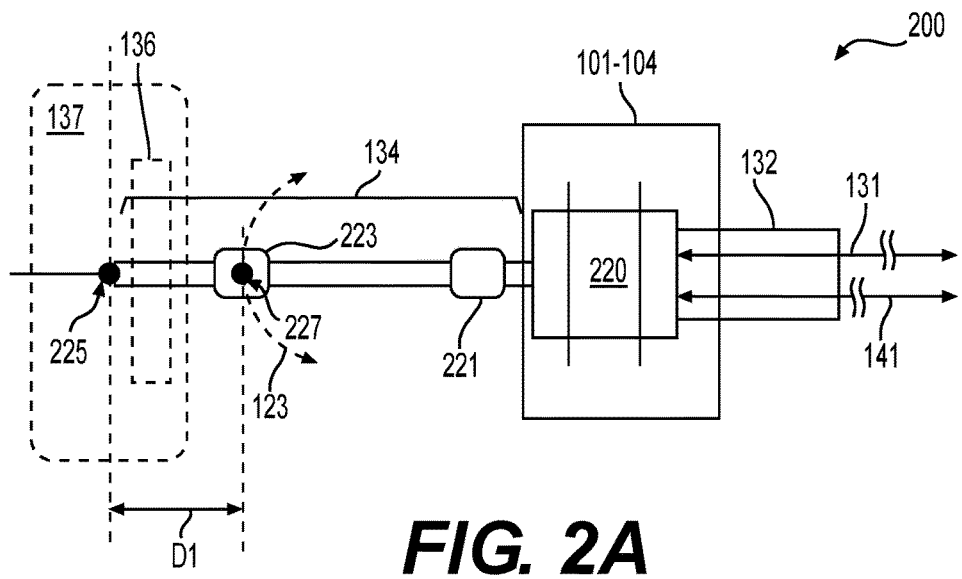
FIG. 2A depicts a diagram of powertrain in an autonomous vehicle that implements torque steering, according to some examples.

FIG. 2A depicts a diagram 200 of powertrain in an autonomous vehicle that implements torque steering, according to some examples. In diagram 200, each powertrain unit (101-104) may include an electric motor 220 (e.g., an AC or DC motor). The motor 220 may be coupled with the axle 134, the axle 134 may constitute a half-shaft having a first CV joint 221 positioned proximate the motor 220 and a second CV joint 227 positioned proximate the wheel 137. In diagram 200, the brake 136 may be positioned at various locations along axle 134, such as within wheel 137, for example. A rotation point 227 of CV joint 223 is positioned to coincide with a pivot point of a kingpin, a steering knuckle or the like (not shown) that is inset a distance D1 from a center point 225 of wheel 137 such that a yaw moment about rotation point 227 may be created to cause torque steering of the wheel 137 by changes in rotational speed of the wheel 137 (e.g., via motor 220, brake 136, regenerative braking, etc.).

Figure 2B:
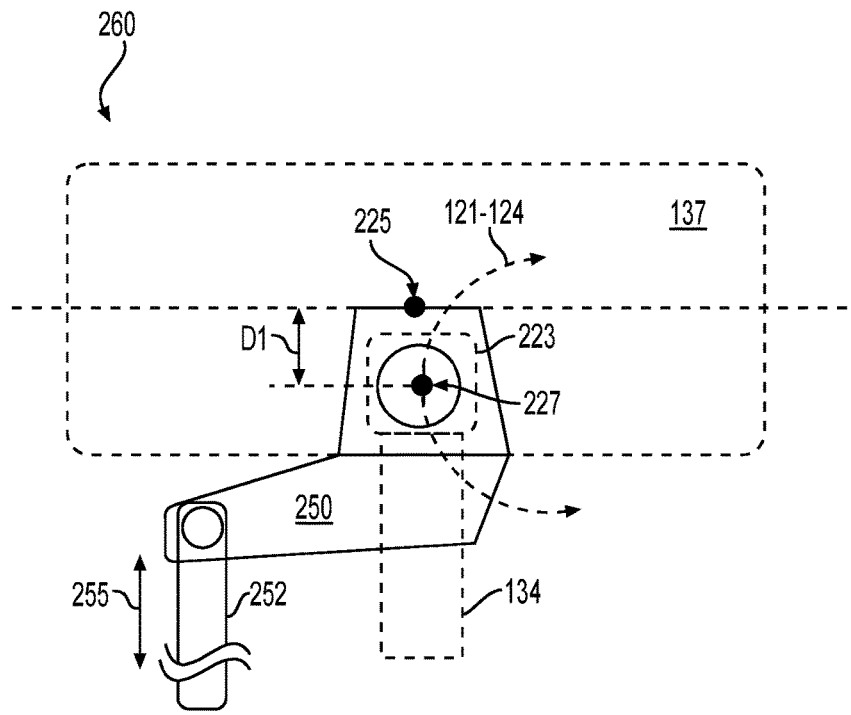
FIG. 2B depicts a diagram of a torque steering mechanism of an autonomous vehicle, according to some examples.
Figure 3A:
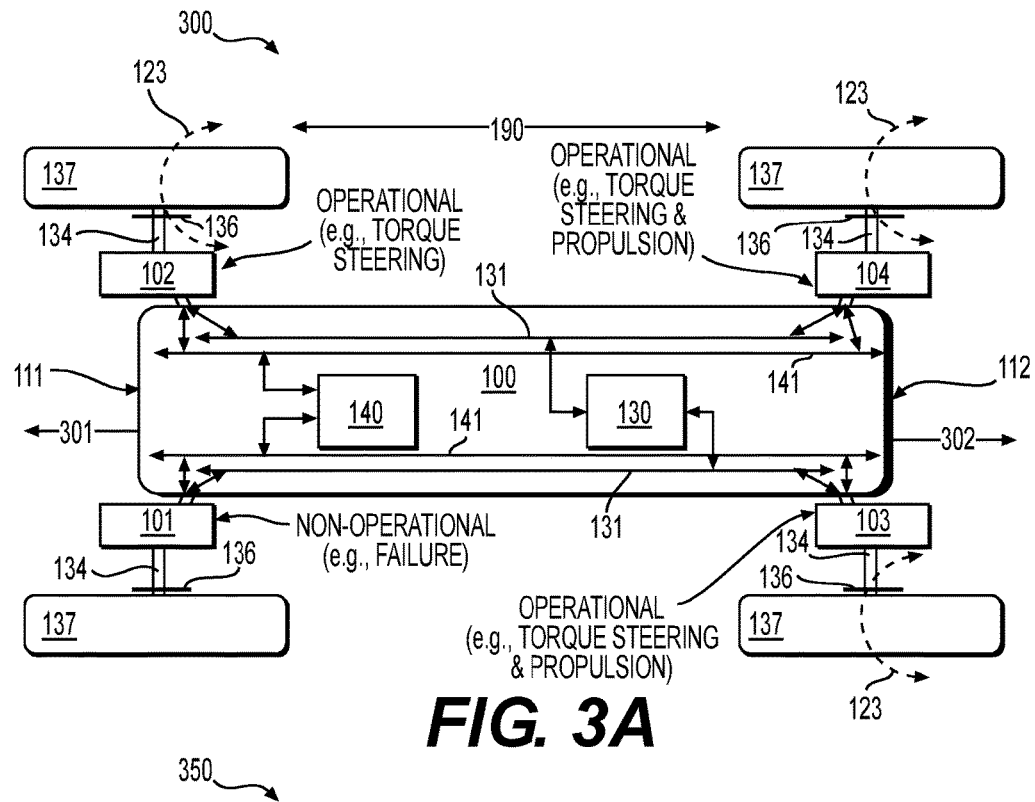
FIGS. 3A-3D depict examples of torque steering in an autonomous vehicle in which at least one powertrain unit is in a non-operational state, according to some examples.
Figure 3B:
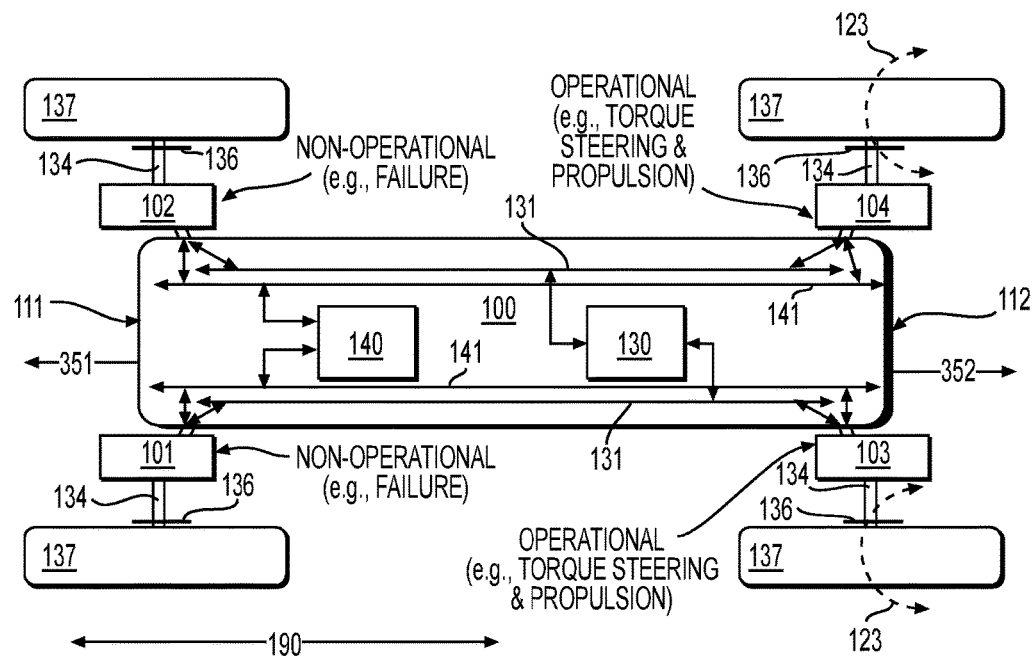
Figure 3C:
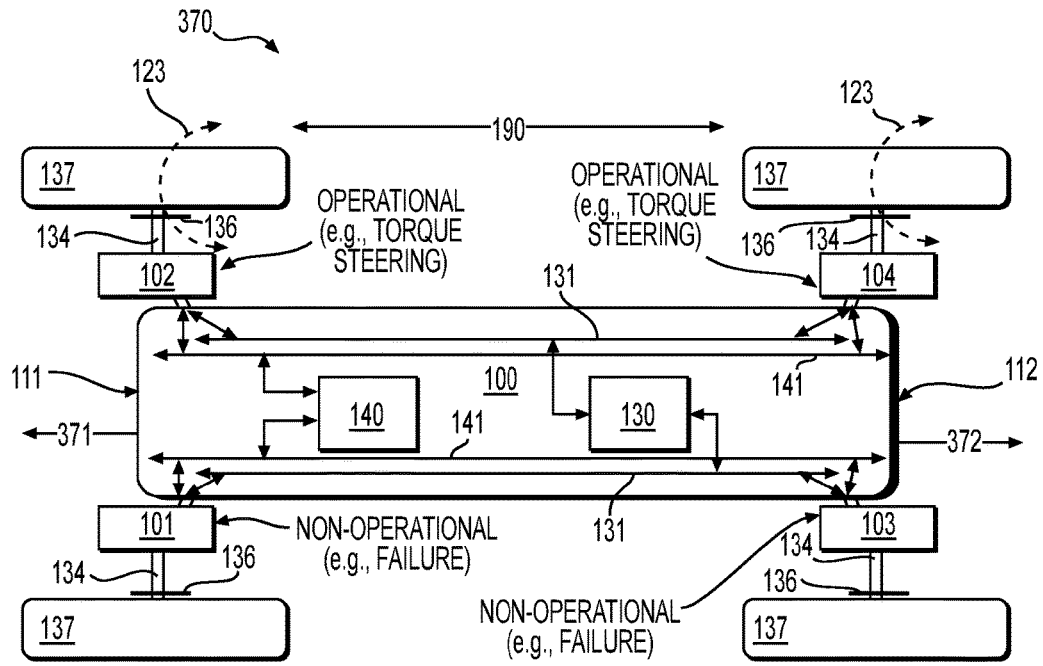
Figure 3D:
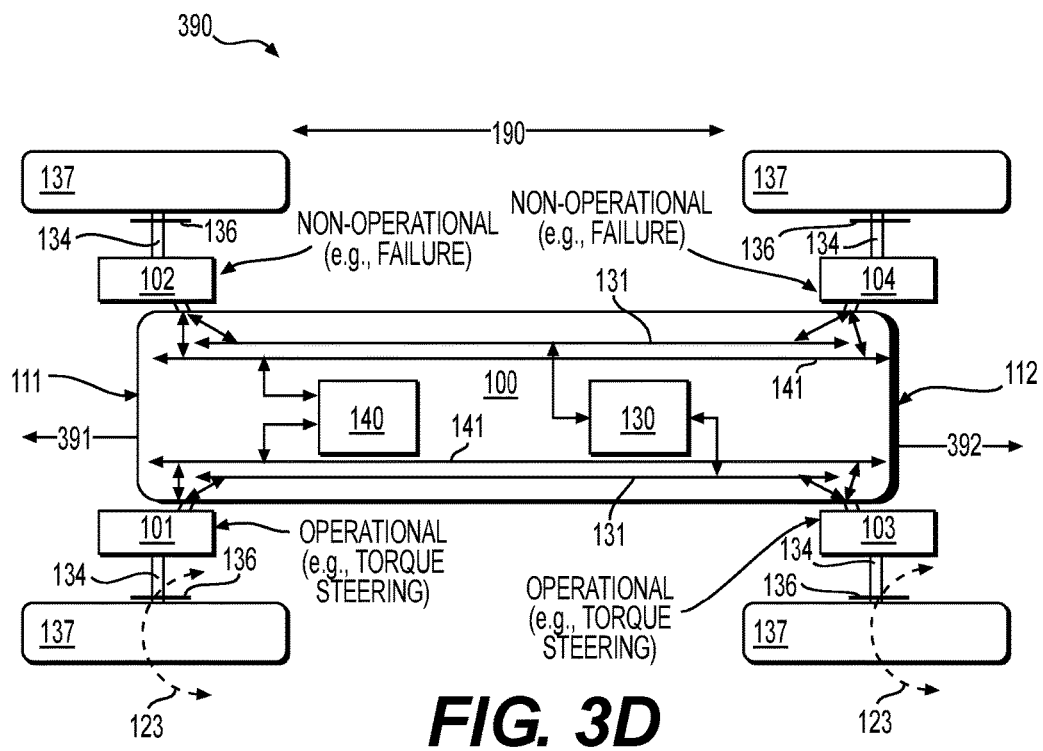
Figure 4A:
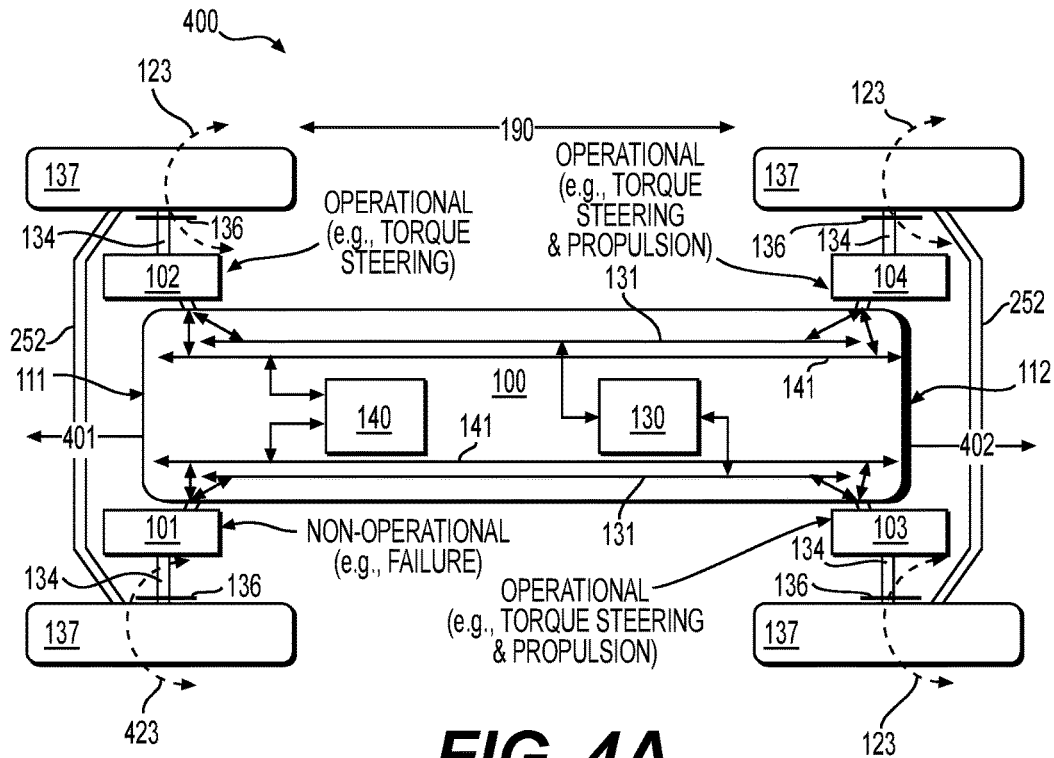
FIGS. 4A-4D depict additional examples of torque steering in an autonomous vehicle in which at least one powertrain unit is in a non-operational state, according to some examples.
Figure 4B:
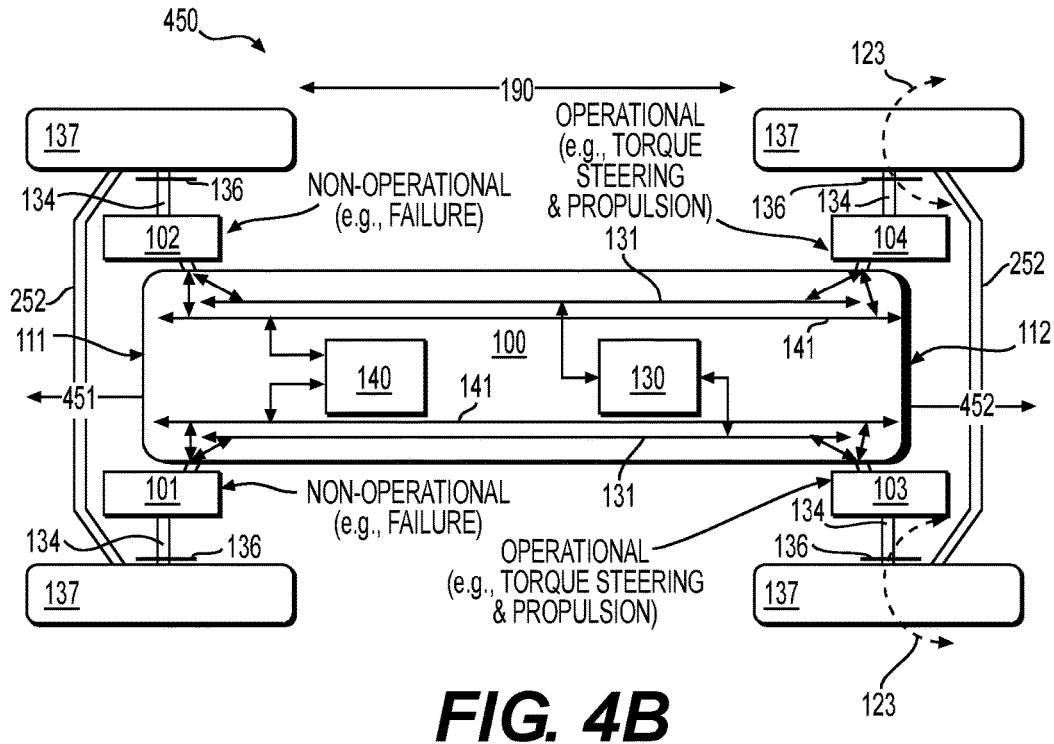
Figure 4C:
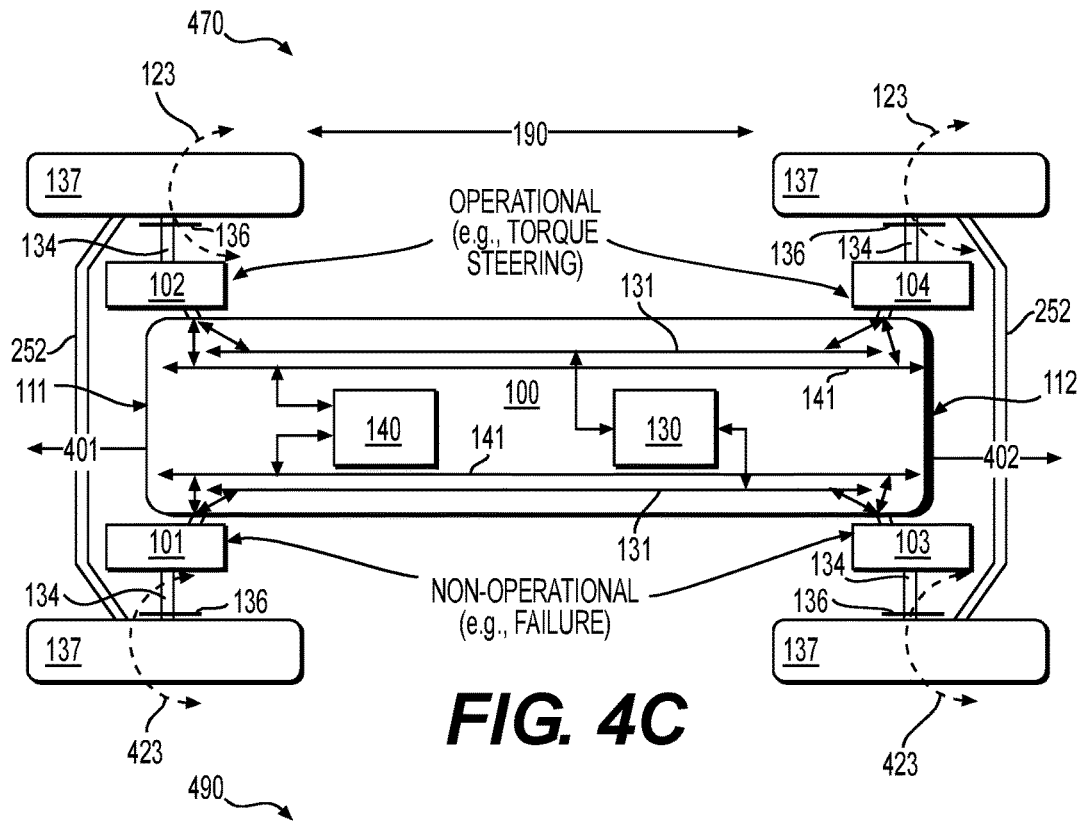
Figure 4D:
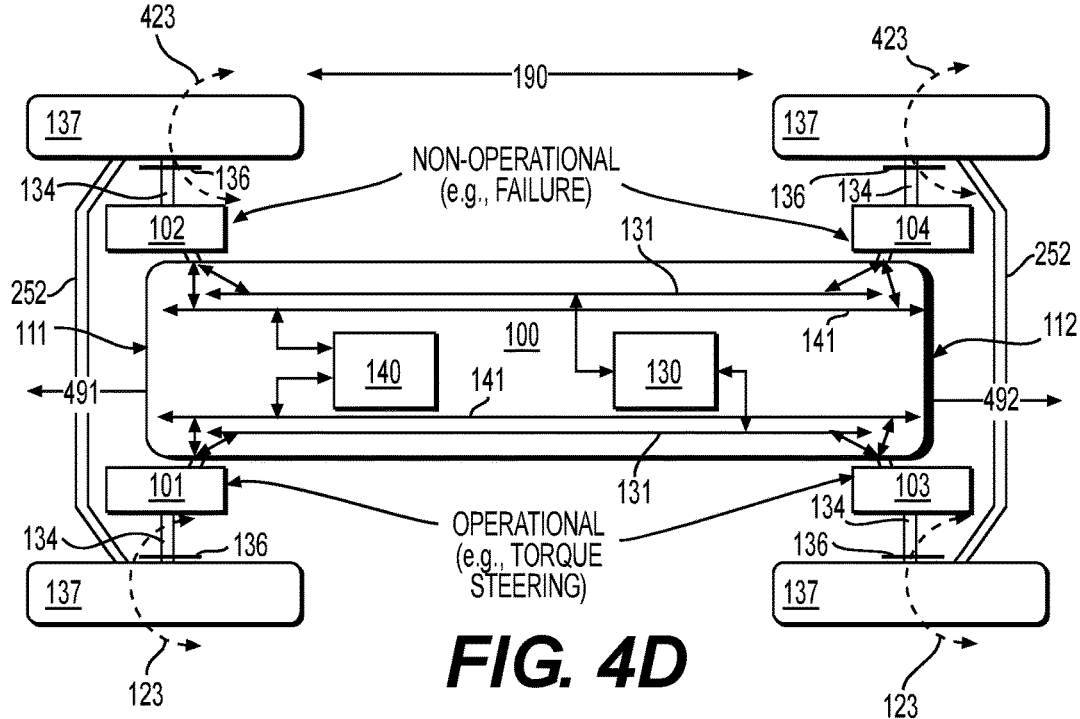

FIG. 2B depicts a diagram 260 of a torque steering mechanism of an autonomous vehicle, according to some examples. In diagram 260, a torque steering mechanism 250 (e.g., a kingpin, a steering knuckle or the like) may be positioned relative to CV joint 223 so that the above described rotation point 227 is aligned with a rotation point or center point of the CV joint 223 and with the rotation point 227 inset by the distance D1 from the center point 225 of wheel 137, for example. Steering mechanism 250 may be configured to couple with a mechanical link 252 that is coupled with the steering mechanism of another powertrain unit (not shown) as will be described below in reference to FIGS. 4A-5. The mechanical link 252 may be configure to move in a direction indicated by arrow 255 in response to torque steering of one or more of the wheels 137.

FIGS. 3A-3D depict examples 300-390 of torque steering in an autonomous vehicle in which at least one powertrain unit is in a non-operational state, according to some examples. In example 300, powertrain unit 101 may be determined to be in a non-operational state (e.g., due to failure of one or more components of powertrain unit 101, non-responsive to commands from AV controller 130, loss of power continuity with power source 140, etc.). The AV controller 130 may detect or otherwise determine that powertrain unit 101 is in the non-operational state and may further determine that powertrain unit 102 (e.g., positioned at the same end, the first end 111 of the vehicle 100) is in an operational state. To prevent unintended yaw moments in wheel 137 of powertrain unit 102 that may be caused by applying power to its motor (see 220 in FIG. 2A), the AV controller 130 may disable propulsion operation of powertrain unit 102. In example 300, torque steering operation of powertrain unit 102 may be enabled by the AV controller 130 to cause a yaw moment in wheel 137 due to a change in rotational speed of the wheel 137 of powertrain unit 102. The change in rotational speed of the wheel 137 of powertrain unit 102 may be implemented by the AV controller 130 causing the brake 136 to be applied or otherwise actuated (e.g., electrically actuated, mechanically actuate, hydraulically actuated, pneumatically actuated or electro-mechanically actuated), for example. In other examples, torque steering of the wheel 137 of powertrain unit 102, or of another powertrain unit, may be implemented by activating regenerative braking of its respective motor (see 220 in FIG. 2A).

In example 300, AV controller 130 may further determine an operational state of powertrain units 103 and 104 (e.g., located at the second end of vehicle 100). AV controller 130 may, upon determining the operational state of powertrain units 103 and 104, enable propulsion operation of the powertrain units 103 and 104. The autonomous vehicle 100 may be propelled (e.g., along its computed path or trajectory) using the propulsion provided by powertrain units 103 and 104 and may be torque steered by powertrain unit 102. Non-operational powertrain unit 101 may be disabled, by AV controller 130, from propulsion operation and torque steer operation in the example 300.

AV controller 130 may, upon determining the operational state of powertrain units 103 and 104, enable torque steering operation of by powertrain units 103 and 104 along with enabling of propulsion operation of the powertrain units 103 and 104, for example. In example 300, AV controller 130 may command travel of the autonomous vehicle 100 with the first end 111 moving in the direction indicated by arrow 301, or may command travel of the autonomous vehicle 100 with the second end 112 moving in the direction indicated by arrow 302, for example.

In example 350, AV controller 130 may determine that powertrain units 101 and 102 (e.g., at the first end 111) are in a non-operational state and may disable propulsion operation and torque steer operation of powertrain units 101 and 102. In example 350, AV controller 130 may determine that powertrain units 103 and 104 are in an operational state and may enable propulsion operation and torque steer operation of powertrain units 103 and 104. Further to example 350, the AV controller 130 may control the propulsion and/or the torque steer operation of powertrain units 103 and 104 to navigate the autonomous vehicle 100 along a safe-stop trajectory that will position the vehicle 100 at a safe location for its passengers and/or the vehicle 100, for example. In the example 350, the AV controller 130 may allow for continued autonomous operation of the vehicle 100 for a limited time until the vehicle 100 arrives at the destination location for the safe-stop trajectory, at which time, driving operation of the vehicle 100 may be autonomously terminated (e.g., in the interest of safety of the passengers, pedestrians, other vehicles, etc.).

Examples 370 and 390 depict alternative scenarios where the AV controller 130 has determined that powertrain units on one side of the vehicle 100 are in a non-operational state (e.g., powertrain units 101 and 103 in example 370 or powertrain units 102 and 104 in example 390), and the powertrain units on the other side of the vehicle 100 are in an operational state (e.g., powertrain units 102 and 104 in example 370 or powertrain units 101 and 103 in example 390). AV controller 130 may disable propulsion operation of the powertrain units that are in the non-operational state and may enable propulsion operation of the powertrain units that are in the operational state. In other examples, the AV controller 130 may disable propulsion operation of the powertrain units that are in the operational state. Further to examples 370 and 390, the AV controller 130 may enable torque steering operation of the powertrain units that are in the operational state and may navigate the autonomous vehicle 100 along a safe-stop trajectory as described above.

FIGS. 4A-4D depict additional examples 400-490 of torque steering in an autonomous vehicle in which at least one powertrain unit is in a non-operational state, according to some examples. In examples 400-490, the powertrain units (101, 102) at the first end 111 of the vehicle 100, the powertrain units (103, 104) at the second end 112 of the vehicle 100, may include a mechanical link 252 (e.g., an Ackerman link) as describe above in FIG. 2B. In examples 400-490, the powertrain units in operational states and in non-operational states are the same as described above in reference to FIGS. 3A-3D; however, a powertrain unit enabled for torque steering operation by the AV controller 130 may cause, via the mechanical link 252, the wheel 137 of the other powertrain unit coupled with the mechanical link 252 to be steered at a steering vector that may the same or may be different than that of the wheel 137 being enabled for torque steering operation.

Figure 5:
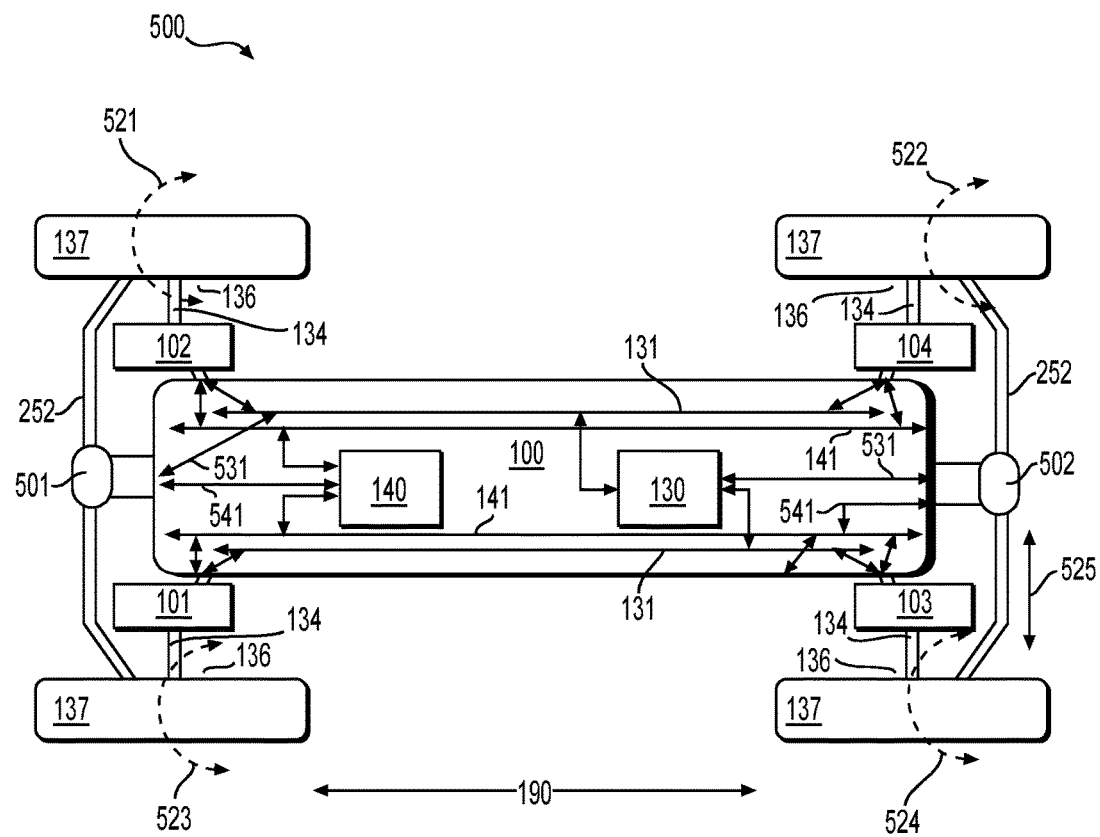
FIG. 5 depicts a diagram of another example of implementation of torque steering in an autonomous vehicle, according to some examples.

FIG. 5 depicts a diagram 500 of another example of implementation of torque steering in an autonomous vehicle, according to some examples. In diagram 500, a power steering unit 501, 502 or both may be coupled with the mechanical link 252. For example, the power steering unit (501, 502) may be an electrical power steering (EPS) unit or an electric power assisted steering (EPAS) unit that is coupled 541 with the power source 140 and coupled 531 with the AV controller 130. The power steering unit (501, 502) may be coupled with its respective mechanical link 252 (e.g., an Ackerman link) via a rack-and-pinion or other forms of mechanical linkage, for example. In diagram 500, the power steering unit (501, 502) may be configured for steering operation during low speed maneuvers by the autonomous vehicle, such as in parking the vehicle 100, while maneuvering in a parking lot or maneuvering in the presence of a large number of pedestrians, for example. The power steering unit (501, 502) may be configured to apply a steering force in a range from about 2 Nm to about 5 Nm, for example.

Figure 6:
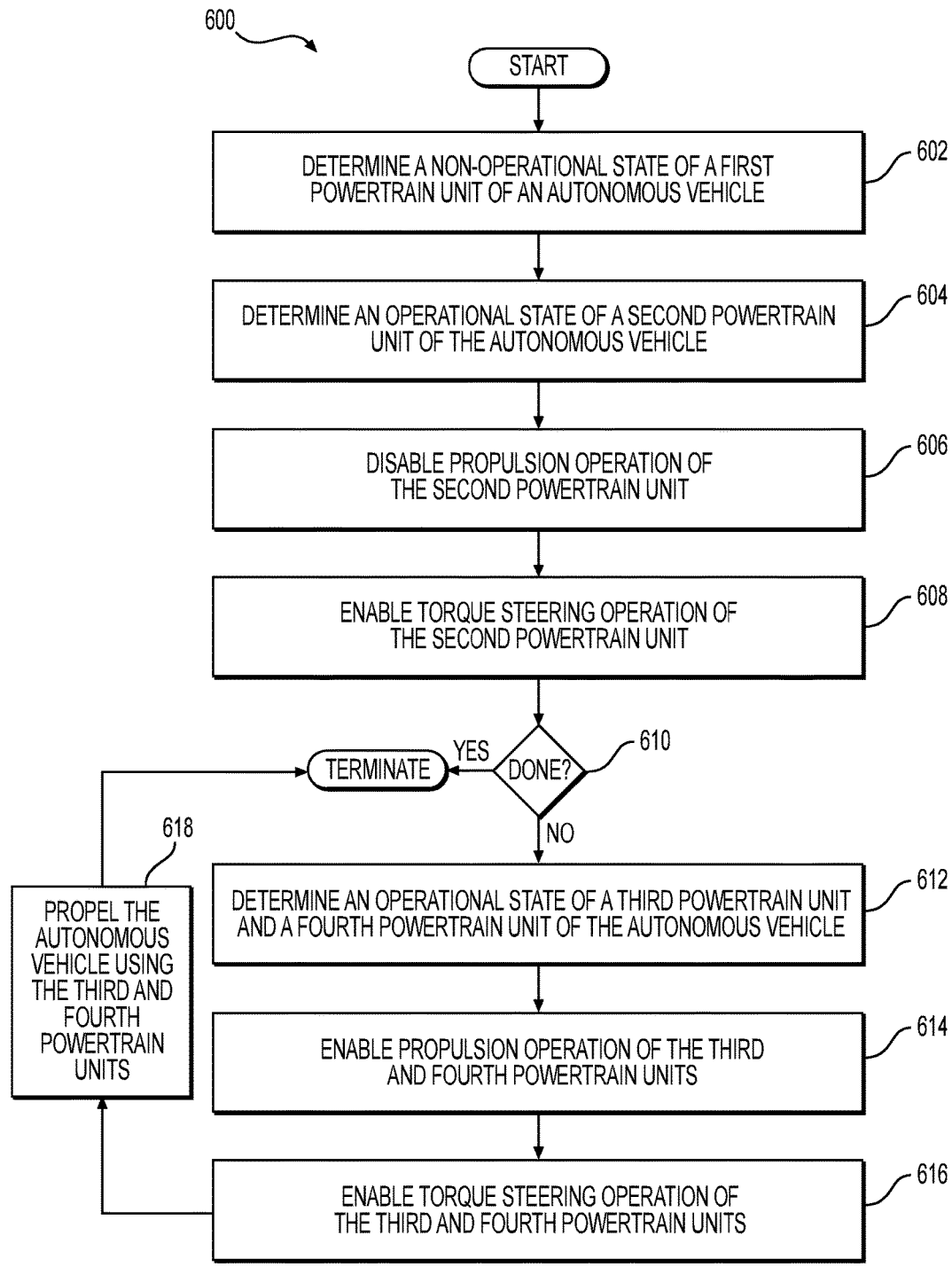
FIG. 6 depicts a flow chart of implementation of torque steering in an autonomous vehicle, according to some examples.

FIG. 6 depicts a flow chart 600 of implementation of torque steering in an autonomous vehicle, according to some examples. At a stage 602, a first powertrain unit of an autonomous vehicle may be determined to be in a nonoperational state. At a stage 604, a second powertrain unit of the autonomous vehicle may be determined to be in an operational state. At a stage 606, propulsion operation of the second powertrain unit of the autonomous vehicle may be disabled. At a stage 608, torque steering operation of the second powertrain unit of the autonomous vehicle may be enabled. At a stage 610 a determination may be made as to whether or not the flow chart 600 is done. If a YES branch is taken, the flow chart 600 may terminate. If a NO branch is taken, then flow chart 600 may transition to a stage 612 where an operational state of a third powertrain unit and a fourth powertrain unit of the autonomous vehicle may be determined. At a stage 614, propulsion operation of the third powertrain unit and the fourth powertrain unit of the autonomous vehicle may be enabled. At a stage 616, torque steering operation of the third powertrain unit and the fourth powertrain unit of the autonomous vehicle may be enabled. At a stage 618, the third powertrain unit and the fourth powertrain unit may propel the autonomous vehicle (e.g., as the vehicle 100 autonomously navigates a selected trajectory).

Figure 7:
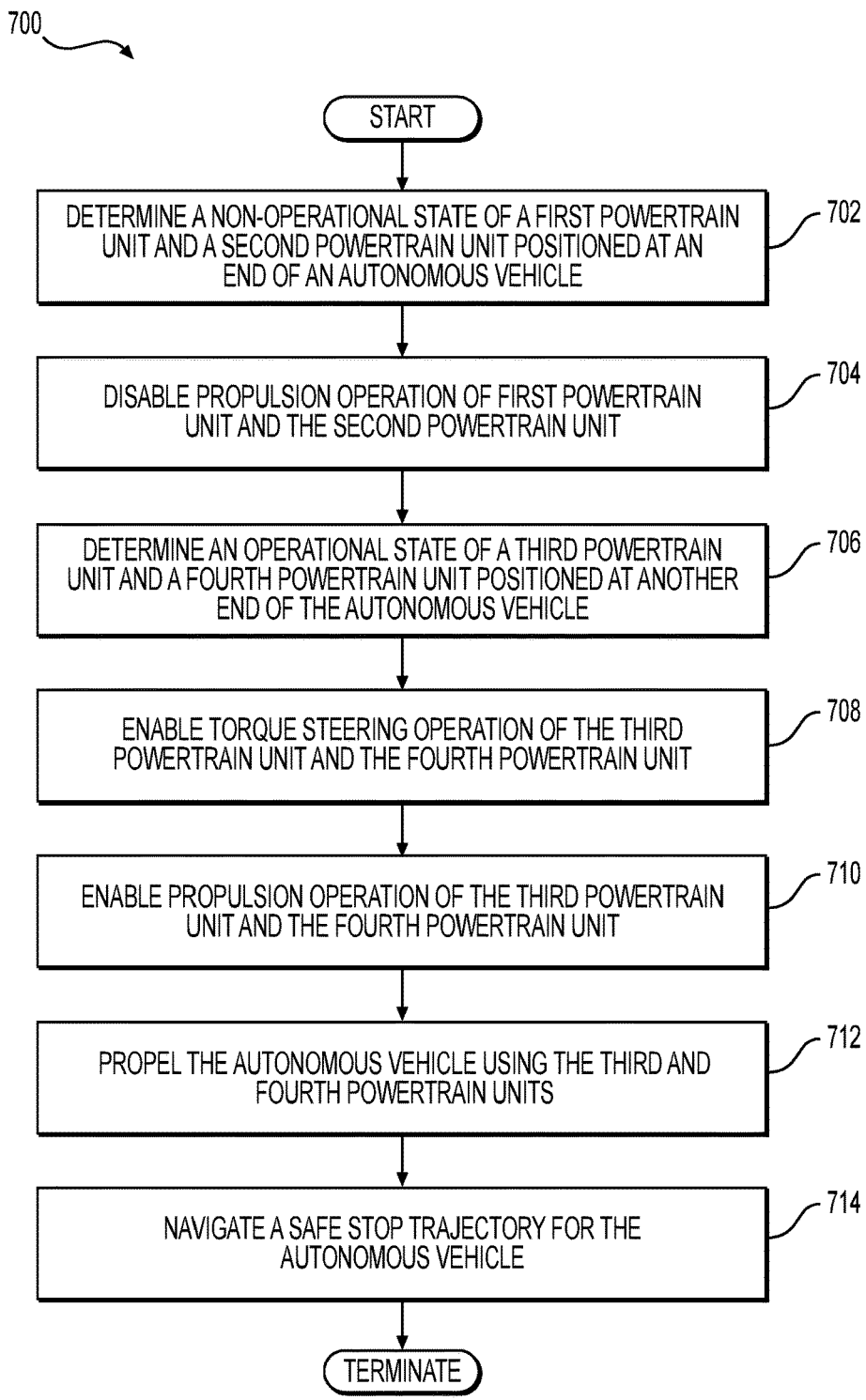
FIG. 7 depicts another flow chart of implementation of torque steering in an autonomous vehicle, according to some examples.

FIG. 7 depicts another flow chart 700 of implementation of torque steering in an autonomous vehicle, according to some examples. At a stage 702, a non-operational state of a first powertrain unit and a second powertrain unit positioned at an end of an autonomous vehicle (e.g., first end 111 or second end 112 of vehicle 100 in FIG. 1) may be determined. At a stage 704, propulsion operation of the first powertrain unit and the second powertrain unit may be disabled. At a stage 706, an operational state of a third powertrain unit and a fourth powertrain unit positioned at another end of the autonomous vehicle (e.g., first end 111 or second end 112 of vehicle 100 in FIG. 1) may be determined. At a stage 708, torque steering operation of the third powertrain unit and the fourth powertrain unit may be enabled. At a stage 710, propulsion operation of the third powertrain unit and the fourth powertrain unit may be enabled. At a stage 712, the autonomous vehicle may be propelled by the third powertrain unit and the fourth powertrain unit. At a stage 714, the autonomous vehicle may navigate a safe-stop trajectory.

Figure 8:
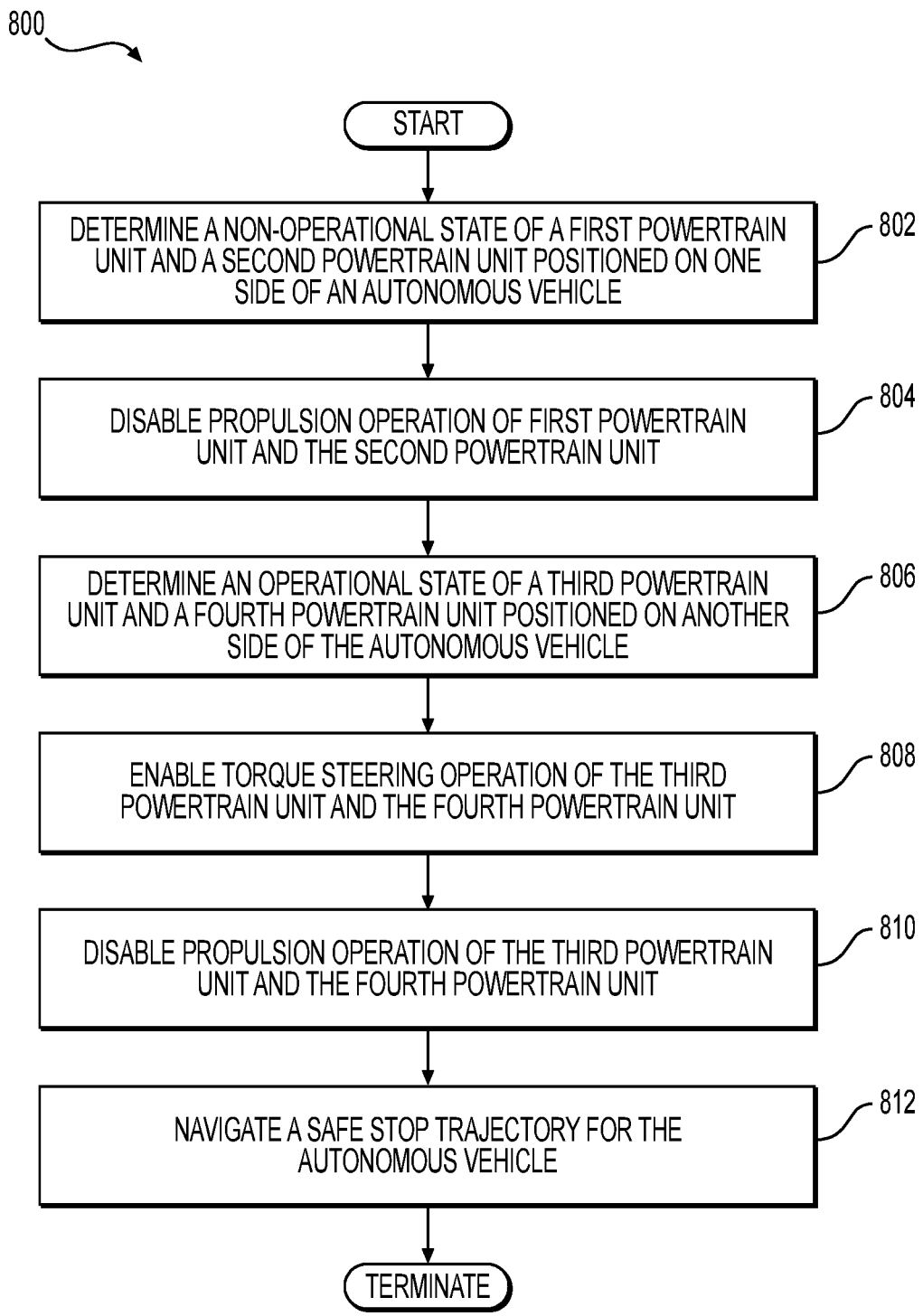
FIG. 8 depicts yet another flow chart of implementation of torque steering in an autonomous vehicle, according to some examples.

FIG. 8 depicts yet another flow chart 800 of implementation of torque steering in an autonomous vehicle, according to some examples. In flow chart 800, at a stage 802, a non-operational state of a first powertrain unit and a second powertrain unit positioned on one side of an autonomous vehicle (e.g., powertrain units 101 and 103 or 102 and 104 of vehicle 100 in FIG. 1) may be determined. At a stage 804, propulsion operation of the first powertrain unit and the second powertrain unit may be disabled. At a stage 806, an operational state of a third powertrain unit and a fourth powertrain unit positioned on another side of an autonomous vehicle (e.g., powertrain units 101 and 103 or 102 and 104 of vehicle 100 in FIG. 1) may be determined. At a stage 808, torque steering operation of the third powertrain unit and the fourth powertrain may be enabled. At a stage 810, propulsion operation of the third powertrain unit and the fourth powertrain may be disabled. At a stage 812, the autonomous vehicle may navigate a safe-stop trajectory.

In the flow charts depicted in FIGS. 6-8, the AV controller 130 or some other system or processor of the autonomous vehicle 100 may implement one or more of the stages depicted.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:
1. A method performed by one or more processors, the method comprising:
  computing a trajectory for an autonomous vehicle;
  causing the autonomous vehicle to navigate along the trajectory;
  determining a nonoperational state of a first powertrain unit of the autonomous vehicle;
  determining an operational state of a second powertrain unit;

disabling a propulsion operation of the second powertrain unit based at least in part on the nonoperational state of the first powertrain unit;
enabling a torque steering operation of the second powertrain unit; and
enabling a propulsion operation of a third powertrain unit and a propulsion operation of a fourth powertrain unit, wherein the torque steering operation creates a yaw such that the autonomous vehicle continues to navigate along the trajectory.

2. The method of claim 1, further comprising propelling, at least in part by the third powertrain unit and the fourth powertrain unit, the autonomous vehicle.

3. The method of claim 1, wherein enabling the torque steering operation comprises, changing, by one or more mechanical linkages coupled to the first powertrain unit and the second powertrain unit, a steering vector of one or more of a first wheel coupled to the first powertrain unit or a second wheel coupled to the second powertrain unit.

4. The method of claim 1, further comprising:
enabling a torque steering of the third powertrain unit and a torque steering of the fourth powertrain unit; and
causing a difference in rotational speed between a third wheel coupled to the third powertrain unit and a fourth wheel coupled to the fourth powertrain unit to change a steering vector of the third wheel and the fourth wheel in the fourth powertrain unit by a yaw moment created by the difference in rotational speed.

5. The method of claim 1, wherein the first powertrain unit and the second powertrain unit are positioned at a first end of the autonomous vehicle, and wherein the method further comprises:
propelling, by the one or more of the third powertrain unit or the fourth powertrain unit, the autonomous vehicle; and
navigating a safe-stop trajectory for the autonomous vehicle.

6. The method of claim 1, further comprising:
disabling a torque steering operation of the first powertrain unit.

7. A system, comprising:
a first powertrain unit positioned on a vehicle;
a second powertrain unit positioned on the vehicle;
a first wheel coupled to the first powertrain unit;
a second wheel coupled to the second powertrain unit; and
one or more vehicle control units coupled to the first powertrain unit and the second powertrain unit, wherein the one or more vehicle control units are configured to:
determine a trajectory for the vehicle;
cause the vehicle to navigate along the trajectory;
determine a nonoperational state of the first powertrain unit;
determine an operational state of the second powertrain unit;
determine to disable a propulsion operation of the second powertrain unit based, at least in part, on the nonoperational state of the first powertrain unit;
disable the propulsion operation of the second powertrain unit;
enable a torque steering operation of the second powertrain unit; and
enable a propulsion operation of a third powertrain unit and a propulsion operation of a fourth powertrain unit,
wherein the torque steering operation causes the vehicle to continue to navigate along the trajectory.

8. The system of claim 7, wherein the one or more vehicle control units are further configured to propel, at least in part by the third powertrain unit and the fourth powertrain unit, the vehicle.

9. The system of claim 7, wherein the one or more vehicle control units are further configured to change, by one or more mechanical linkages coupled to the first powertrain unit and the second powertrain unit, a steering vector of one or more of the first wheel coupled to the first powertrain unit or the second wheel coupled to the second powertrain unit.

10. The system of claim 7, wherein the one or more vehicle control units are further configured to cause a difference in rotational speed between a third wheel coupled to the third powertrain unit and a fourth wheel coupled to the fourth powertrain unit to change a steering vector of the third wheel and the fourth wheel in the fourth powertrain unit by a yaw moment created by the difference in rotational speed.

11. The system of claim 7, wherein the one or more vehicle control units are further configured to:
enable a torque steering operation of the third powertrain unit;
enable a torque steering operation of the fourth powertrain unit; and
cause the vehicle to navigate along a safe-stop trajectory.

12. The system of claim 7, wherein the one or more vehicle control units are further configured to disable a torque steering operation of the first powertrain unit.

13. A vehicle, comprising:
powertrain units, including:
a first powertrain unit coupled to a first wheel;
a second powertrain unit coupled to a second wheel;
a third powertrain unit coupled to a third wheel; and
a fourth powertrain unit coupled to a fourth wheel; and
one or more vehicle control units coupled to the powertrain units, wherein the one or more vehicle control units are configured to:
determine a trajectory;
cause the vehicle to navigate along the trajectory;
determine a nonoperational state of the first powertrain unit;
determine an operational state of the second powertrain unit;
disable a propulsion operation of the second powertrain unit based, at least in part, on the nonoperational state of the first powertrain unit;
enable a torque steering operation of the second powertrain unit; and
enable a propulsion operation of a third powertrain unit and a propulsion operation of a fourth powertrain unit,
wherein the torque steering operation causes the vehicle to continue to navigate along the trajectory.

14. The vehicle of claim 13, wherein the one or more vehicle control units are further configured to
propel, at least in part by the third powertrain unit and the fourth powertrain unit, the vehicle.

15. The vehicle of claim 13, wherein the one or more vehicle control units are further configured to:
enable a torque steering operation for the third powertrain unit and a torque steering operation for the fourth powertrain unit; and
cause a difference in rotational speed between the third wheel and the fourth wheel to change a steering vector of based at least in part on the difference in rotational speed.

16. The vehicle of claim 13, wherein the one or more vehicle control units are further configured to navigate a safe-stop trajectory for the vehicle.

17. The method of claim 1, further comprising:
   determining an operational state of the third powertrain unit; and
   determining an operation state of the fourth powertrain unit,
   wherein enabling the propulsion operation of the third powertrain unit and the propulsion operation of the fourth powertrain unit is further based on the operational state of the third powertrain unit and the operational state of the fourth powertrain unit.

18. The method of claim 1, further comprising:
   enabling a torque steering operation of the third powertrain unit; and
   enabling a torque steering operation of the fourth powertrain unit.

19. The system of claim 7, wherein the one or more vehicle control units are further configured to:
   determine an operational state of the third powertrain unit; and
   determine an operational state of the fourth powertrain unit,
   wherein enabling the propulsion operation of the third powertrain unit and the propulsion operation of the fourth powertrain unit is further based on the operational state of the third powertrain unit and the operational state of the fourth powertrain unit.

20. The system of claim 7, wherein the one or more vehicle control units are further configured to:
   enable a torque steering operation of the third powertrain unit; and
   enable a torque steering operation of the fourth powertrain unit.

21. The vehicle of claim 13, wherein the first wheel and the second wheel are positioned in a first end of the vehicle, and wherein the third wheel and the fourth wheel are positioned in a second end of the vehicle.

22. The vehicle of claim 13, wherein the one or more vehicle control units are further configured to:
   determine that the third powertrain unit is operation based, at least in part, on an operational state of the third powertrain unit; and
   determine that the fourth powertrain unit is operation based, at least in part, on an operational state of the fourth powertrain unit,
   wherein enabling the propulsion operation of the third powertrain unit and the propulsion operation of the fourth powertrain unit is further based on the third powertrain unit being operational and the fourth powertrain unit being operational.

* * * * *